US007409312B2

(12) United States Patent
Conner et al.

(10) Patent No.: US 7,409,312 B2
(45) Date of Patent: Aug. 5, 2008

(54) HANDHELD LASER LIGHT DETECTOR WITH HEIGHT CORRECTION, USING A GPS RECEIVER TO PROVIDE TWO-DIMENSIONAL POSITION DATA

(75) Inventors: Robert G. Conner, New Carlisle, OH (US); James T. Zalusky, Beavercreek, OH (US)

(73) Assignee: Apache Technologies, Inc., Dayton, OH (US)

( * ) Notice: Subject to any disclaimer, the term of this patent is extended or adjusted under 35 U.S.C. 154(b) by 0 days.

(21) Appl. No.: 11/824,459

(22) Filed: Jun. 29, 2007

(65) Prior Publication Data

US 2008/0015811 A1    Jan. 17, 2008

Related U.S. Application Data

(60) Provisional application No. 60/906,362, filed on Mar. 12, 2007, provisional application No. 60/830,282, filed on Jul. 12, 2006.

(51) Int. Cl.
*G01B 11/02* (2006.01)
(52) U.S. Cl. .................... 702/159; 702/150; 356/249
(58) Field of Classification Search ............. 702/95, 702/97, 149, 150, 159; 33/286, 640; 356/248, 356/249
See application file for complete search history.

(56) References Cited

U.S. PATENT DOCUMENTS

| 2,830,487 A | 4/1958 | Griffith |
| 3,017,046 A | 1/1962 | Runchi et al. |
| 3,469,919 A | 9/1969 | Zellner |
| 3,687,556 A | 8/1972 | Price et al. |
| 3,708,232 A | 1/1973 | Walsh |

(Continued)

FOREIGN PATENT DOCUMENTS

EP    01688758 A2    8/2006

(Continued)

OTHER PUBLICATIONS

"360 degree Machine Guidance" and "Depthmaster" sales literature, by Laser Alignment, Inc. (exact date unknown, but known to be before Jun. 12, 1989).

(Continued)

*Primary Examiner*—Bryan Bui
(74) *Attorney, Agent, or Firm*—Frederick H. Gribbell

(57) ABSTRACT

A laser light receiver is provided with an integral laser distance measurement (LDM) device for measuring the distance from a laser plane of a desired elevation to a desired physical target point to be measured on a jobsite. The laser receiver can be combined with a gravity reference device, so that the laser receiver does not necessarily have to be held plumb to a desired target point, when determining the relative elevation of the laser receiver between a rotating beam of laser light and the target point; it can also acquire multiple samples of positions and automatically take a vertical measurement and store that result for later readout. The laser receiver can be further combined with a GPS receiver, to acquire latitude and longitude data, and then in combination act as a three-dimensional transducer that is more accurate in the vertical direction than a GPS receiver alone is capable of.

31 Claims, 10 Drawing Sheets

U.S. PATENT DOCUMENTS

| | | |
|---|---|---|
| 3,727,332 A | 4/1973 | Zimmer |
| 3,790,277 A | 2/1974 | Hogan |
| 3,813,171 A | 5/1974 | Teach et al. |
| 3,887,012 A | 6/1975 | Scholl et al. |
| 3,894,230 A | 7/1975 | Rorden et al. |
| 3,900,073 A | 8/1975 | Crum |
| 3,997,071 A | 12/1976 | Teach |
| 4,029,415 A | 6/1977 | Johnson |
| 4,034,490 A | 7/1977 | Teach |
| 4,040,738 A | 8/1977 | Wagner |
| 4,050,171 A | 9/1977 | Teach |
| 4,052,600 A | 10/1977 | Wertheimer |
| 4,129,224 A | 12/1978 | Teach |
| 4,162,708 A | 7/1979 | Johnson |
| 4,231,700 A | 11/1980 | Studebaker |
| 4,268,167 A | 5/1981 | Alderman |
| 4,273,196 A | 6/1981 | Etsusaki et al. |
| 4,393,606 A | 7/1983 | Warnecke |
| 4,413,684 A | 11/1983 | Duncklee |
| 4,477,168 A | 10/1984 | Hosoe |
| 4,491,927 A | 1/1985 | Bachmann et al. |
| 4,503,622 A | 3/1985 | Swartz et al. |
| 4,535,699 A | 8/1985 | Buhler |
| 4,573,783 A | 3/1986 | Maruyama |
| 4,604,025 A | 8/1986 | Hammoud |
| 4,674,870 A | 6/1987 | Cain et al. |
| 4,676,634 A | 6/1987 | Petersen |
| 4,726,682 A | 2/1988 | Harms et al. |
| 4,732,471 A | 3/1988 | Cain et al. |
| 4,756,617 A | 7/1988 | Cain et al. |
| 4,818,107 A | 4/1989 | Ono et al. |
| 4,829,418 A | 5/1989 | Nielsen et al. |
| 4,857,717 A | 8/1989 | Chino et al. |
| 4,884,939 A | 12/1989 | Nielsen |
| 4,907,874 A | 3/1990 | Ake |
| 4,911,548 A | 3/1990 | Keren-Gill |
| 4,912,643 A | 3/1990 | Beirxe |
| 4,926,050 A | 5/1990 | Shemwell |
| 4,976,538 A | 12/1990 | Ake |
| 5,110,202 A | 5/1992 | Dornbusch et al. |
| 5,159,400 A | 10/1992 | Takeda et al. |
| 5,174,385 A | 12/1992 | Shinbo et al. |
| 5,189,484 A | 2/1993 | Koschmann et al. |
| 5,243,397 A | 9/1993 | Friedland |
| 5,247,487 A | 9/1993 | Beliveau et al. |
| 5,262,837 A | 11/1993 | Shyy |
| 5,280,744 A | 1/1994 | DeCarlo et al. |
| 5,343,033 A | 8/1994 | Cain |
| 5,471,049 A | 11/1995 | Cain |
| 5,486,690 A | 1/1996 | Ake |
| 5,512,905 A | 4/1996 | Nichols et al. |
| 5,528,498 A | 6/1996 | Scholl |
| 5,619,262 A | 4/1997 | Uno et al. |
| 5,682,311 A | 10/1997 | Clark |
| 5,734,348 A | 3/1998 | Aoki et al. |
| 5,742,069 A | 4/1998 | Steenwyk et al. |
| 5,742,394 A | 4/1998 | Hansen |
| 5,784,792 A | 7/1998 | Smith |
| 5,844,679 A * | 12/1998 | Detweiler et al. .......... 356/248 |
| 5,848,485 A | 12/1998 | Anderson et al. |
| 5,854,988 A | 12/1998 | Davidson et al. |
| 5,886,776 A | 3/1999 | Yost et al. |
| 5,925,085 A | 7/1999 | Kleimenhagen et al. |
| 5,935,183 A | 8/1999 | Sahm et al. |
| 5,949,530 A | 9/1999 | Wetteborn |
| 5,950,141 A | 9/1999 | Yamamoto et al. |
| 5,960,378 A | 9/1999 | Watanabe et al. |
| 6,066,846 A | 5/2000 | Takada et al. |
| 6,133,991 A | 10/2000 | Ake |
| 6,166,802 A | 12/2000 | Kodaira et al. |
| 6,263,595 B1 | 7/2001 | Ake |
| 6,292,258 B1 | 9/2001 | D'Alessandro et al. |
| 6,337,473 B2 | 1/2002 | Yamazaki et al. |
| 6,366,395 B1 | 4/2002 | Drake et al. |
| 6,396,571 B2 | 5/2002 | Ohtomo et al. |
| 6,473,167 B1 | 10/2002 | Odell |
| 6,501,422 B1 | 12/2002 | Nichols |
| 6,545,751 B2 * | 4/2003 | Beliveau et al. .......... 356/141.4 |
| 6,573,981 B2 | 6/2003 | Kumagai et al. |
| 6,618,133 B2 | 9/2003 | Hedges et al. |
| 6,633,256 B2 | 10/2003 | Zhdanov et al. |
| 6,665,067 B2 | 12/2003 | Ogawa et al. |
| 7,012,237 B1 | 3/2006 | Ake |
| 7,013,571 B2 | 3/2006 | El-Katcha et al. |
| 7,073,268 B1 * | 7/2006 | Etter et al. .................. 33/286 |
| 7,079,987 B2 | 7/2006 | Green |
| 2001/0023766 A1 | 9/2001 | Ohtomo et al. |
| 2003/0058446 A1 | 3/2003 | Douglas |
| 2003/0137449 A1 | 7/2003 | Vashisth et al. |
| 2003/0174305 A1 | 9/2003 | Kasper et al. |
| 2003/0202172 A1 | 10/2003 | Douglas |
| 2007/0008515 A1 | 1/2007 | Otani et al. |

FOREIGN PATENT DOCUMENTS

| | | |
|---|---|---|
| EP | 01726915 A1 | 11/2006 |
| GB | 2 101 077 A | 1/1983 |
| JP | 6-3298 | 1/1994 |
| JP | 11-64751 | 3/1999 |
| WO | WO 02/10681 | 2/2002 |
| WO | WO 2006/022879 | 3/2006 |

OTHER PUBLICATIONS

"Laser Control-Receiver LRE-180/360" sales literature, by MOBA Electronic (exact date unknown, but known to be before Jun. 12, 1989).

"A Lock-in Amplifier Primer," by Princeton Applied Research (1975).

"Explore the Lock-In Amplifier," by EG&G Princeton Applied Research, Scientific Instrument Group (1983).

"Laserplane Grade-Eye," sales literature, by Spectra-Physics (1985).

Saleh et al., "Fundamentals of Photonics," A Wiley-Interscience Publication, pp. 5-6 and 296-297 (1991).

Roberts, G. W. et al., "Global Positioning System aided autonomous construction plant control and guidance," Automation in Construction, vol. 8, Issue 5, pp. 589-595 (Jun. 1999).

"What is Lock-in Amplifier?" Technical Note TN 1000, by PerkinElmer Instruments (2000).

"Application Note #3 About Lock-in Amplifiers," by PerkinElmer Instruments.

"The Analog Lock-in Amplifier," Technical Note TV 1002, by PerkinElmer Instruments (2000).

"What is a Lock-in Amplifier?" by Boston Electronic Corporation.

International Search Report, PCT/EP01/08841, 6 pages (Nov. 2001).

International Search Report, PCT/DE2005/001989, 6 pages (Mar. 2006).

"Lecia Geosystems Introduces Economical One-Person RTK GPS Survey System," press release, 4 pages (Jul. 31, 2006).

PCT International Search Report, PCT/US07/015179, 14 pages (Feb. 8, 2008).

PCT Article 19 Amendment, PCT/US07/015179, 8 pages (Apr. 2, 2008).

* cited by examiner

HANDHELD LASER LIGHT DETECTOR WITH HEIGHT CORRECTION, USING A GPS RECEIVER TO PROVIDE TWO-DIMENSIONAL POSITION DATA

CROSS-REFERENCE TO RELATED APPLICATIONS

The present application claims priority to provisional patent application Ser. No. 60/830,282, titled "HANDHELD LASER LIGHT DETECTOR WITH HEIGHT CORRECTION," filed on Jul. 12, 2006; and claims priority to provisional patent application Ser. No. 60/906,362, titled "HANDHELD LASER LIGHT DETECTOR WITH HEIGHT CORRECTION, USING A GPS RECEIVER TO PROVIDE TWO-DIMENSIONAL POSITION DATA," filed on Mar. 12, 2007.

TECHNICAL FIELD

The present invention relates generally to laser receivers and is particularly directed to laser receivers of the type which are used on construction jobsites for measuring relative elevation. The invention is specifically disclosed as a laser receiver that includes an automatic height correction capability, which can be detected by a combination of laser distance measurement device, and a gravity sensor or level detection device. The invention is also disclosed as a laser receiver with an automatic height correction capability, and further is combined with a Global Positioning Sensor (GPS) receiver to acquire two-dimensional position data for the horizontal plane, and in combination thus provide a more accurate three-dimensional position "fix."

BACKGROUND OF THE INVENTION

The measurement of relative elevation is an important element in almost any phase of a construction project. In the last few decades, the use of laser reference planes has grown as a way to satisfy this demand for accurate elevation information. The laser plane is created by a laser transmitter. A variety of methods are used to do this, but one of the most common is a rotating beam of light. The laser transmitter is typically placed at a known elevation. The plane of light is frequently set up to be level with respect to gravity so that all points on the laser plane are at the same elevation.

To use this laser plane to measure the elevation of a point, a worker will mount a laser receiver on a pole or a handle. The bottom of the pole/handle will rest on the point whose elevation will be measured. However, the pole/handle must be held plumb with respect to gravity. The laser receiver is positioned in the plane of laser light such that it indicates an on-grade position. The relative elevation can then be read as the length of the pole/handle between the point being measured and the on-grade position of the receiver. Many different pole/handle designs are available to make this job easier. Most provide an easy height adjustment and a scale that can be read at a convenient height for the worker.

While these methods are widely used, there is room for improvement. The pole/handle itself can be expensive and less rugged than users desire. Much care must be taken to assure accurate measurements. Some points on a jobsite are inaccessible for measurement by this method, so it can be seen that there are limitations to that methodology.

In addition to the above, the use of GPS receivers for survey and machine control is well known in the field of construction. However, due to technical limitations in GPS receivers, the vertical accuracy is at least a factor of two (2) worse than the accuracy in the plane parallel to the Earth's surface. Frequently, the vertical dimension is the most important, so there is an incentive to improve this.

SUMMARY OF THE INVENTION

Accordingly, it is an advantage of the present invention to provide a laser receiver unit that includes a laser distance measurement device for measuring the distance from a laser plane of a desired elevation to a desired physical target point to be measured on a job site.

It is another advantage of the present invention to provide a laser receiver unit that is combined with a gravity reference device, so that the laser receiver unit does not necessarily have to be held plumb to a desired target point, when determining the relative elevation of the laser receiver between a rotating beam of laser light and the target point.

It is yet another advantage of the present invention to provide a laser receiver unit that includes both the laser distance measurement device and a gravity reference device, and also has the capability of automatically acquiring samples of positions of the laser receiver with respect to a rotating beam of laser light and with respect to a desired target point on a job site, and which can automatically take a vertical measurement and store that result for later readout to a human user.

It is still another advantage of the present invention to provide a laser receiver unit that is combined with a height correction device and with a GPS receiver; the laser receiver can accurately determine the relative elevation between a rotating beam of laser light and the target point, and the vertical accuracy of the laser receiver with height correction is greater than what can be achieved by a GPS receiver alone, so the result is an instrument that provides a more accurate three-dimensional position fix.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a laser light receiver is provided, which comprises: a housing; a first laser light photosensor, which generates a first signal if receiving a beam of laser light energy from an external laser light source; a visible readout to indicate if the laser light receiver is substantially on-grade with respect to the beam of laser light energy; a visible light marker; a distance measuring device that uses a second laser light source and a second laser light photosensor, the distance measuring device being used to substantially determine a first distance between the second laser light photosensor and a predetermined external position, as selected by a user of the laser light receiver apparatus while aiming the visible light marker, the second laser light photosensor generating a second signal if receiving reflected laser light energy from the second laser light source; a level vial; and a processing circuit that receives the first signal and the second signal; wherein the housing, the first laser light photosensor, the distance measuring device, the level vial, the visible readout, and the processing circuit are assembled as a unitary hand-held apparatus.

In accordance with another aspect of the present invention, a laser light receiver is provided, which comprises: a housing; a first laser light photosensor, which generates a first signal if receiving a beam of laser light energy from an external laser light source; a visible readout to indicate if the laser light receiver is substantially on-grade with respect to the beam of laser light energy; a visible light marker; a distance measuring device that uses a second laser light source and a second laser light photosensor, the distance measuring device being used to substantially determine a first distance between the second laser light photosensor and a predetermined external position, as selected by a user of the laser light receiver apparatus while aiming the visible light marker, the second laser light photosensor generating a second signal if receiving reflected laser light energy from the second laser light source; a gravity sensor that generates a third signal that is substantially indicative of an angular orientation of the housing with respect to gravity; and a processing circuit that receives the first signal, the second signal, and the third signal; wherein the housing, the first laser light photosensor, the distance measuring device, the gravity sensor, the visible readout, and the processing circuit are assembled as a unitary hand-held apparatus.

In accordance with yet another aspect of the present invention, a laser light receiver is provided, which comprises: a housing; a first laser light photosensor, which generates a first signal if receiving a beam of laser light energy from an external laser light source, the first signal being indicative of a second distance between the beam of laser light energy and an on-grade position of the laser light receiver; a visible light marker; a distance measuring device that uses a second laser light source and a second laser light photosensor, the distance measuring device being used to substantially determine a first distance between the second laser light photosensor and a predetermined external position, as selected by a user of the laser light receiver apparatus while aiming the visible light marker, the second laser light photosensor generating a second signal if receiving reflected laser light energy from the second laser light source; a gravity sensor that generates a third signal that is substantially indicative of an angular orientation of the housing with respect to gravity; a visible readout to indicate a relative elevation; and a processing circuit that receives the first signal, the second signal, and the third signal; wherein the housing, the first laser light photosensor, the distance measuring device, the gravity sensor, the visible readout, and the processing circuit are assembled as a unitary hand-held apparatus.

In accordance with still another aspect of the present invention, a laser light receiver is provided, which comprises: a housing; a first laser light photosensor, which generates a first signal if receiving a beam of laser light energy from an external laser light source, the first signal being indicative of a second distance between the beam of laser light energy and an on-grade position of the laser light receiver; a visible light marker; a distance measuring device that uses a second laser light source and a second laser light photosensor, the distance measuring device being used to substantially determine a first distance between the second laser light photosensor and a predetermined external position, as selected by a user of the laser light receiver apparatus while aiming the visible light marker, the second laser light photosensor generating a second signal if receiving reflected laser light energy from the second laser light source; a GPS (global positioning sensor) receiver that generates a third signal that is indicative of a position with respect to the Earth's surface; a tilt indication device; a visible readout to indicate a relative elevation between the predetermined external position and the beam of laser light energy; and a processing circuit that receives the first signal, the second signal, and the third signal; wherein: (a) the housing, the first laser light photosensor, the distance measuring device, the tilt indication device, the visible readout, the GPS receiver, and the processing circuit are assembled as a unitary hand-held apparatus; and (b) the processing circuit is configured to: (i) use the third signal is to substantially determine a position in the horizontal plane with respect to the Earth's surface, and (ii) use the first and second signals to substantially determine the relative elevation, based upon the first distance and the second distance.

In accordance with a further aspect of the present invention, a method for determining an elevation is provided, in which the method comprises the following steps: providing a laser light receiver having: a housing, a first laser light photosensor that generates a first signal if receiving a beam of laser light energy from an external laser light source, a visible readout, a visible light marker, a distance measuring device that uses a second laser light source and a second laser light photosensor, a level vial, and a processing circuit; aiming the visible light marker at a predetermined external position, while holding the housing at a substantially level orientation, as indicated by the level vial; determining substantially a first distance between the second laser light photosensor and the predetermined external position, by use of the distance measuring device; determining substantially a second distance of the laser light receiver with respect to the beam of laser light energy; and determining substantially a relative elevation between the predetermined external position and the beam of laser light energy, based upon the first distance and the second distance.

In accordance with a yet further aspect of the present invention, a method for determining an elevation is provided, in which the method comprises the following steps: providing a laser light receiver having: a housing, a first laser light photosensor that generates a first signal if receiving a beam of laser light energy from an external laser light source, a visible readout, a visible light marker, a distance measuring device that uses a second laser light source and a second laser light photosensor, a gravity sensor which generates a tilt-angle signal that is substantially indicative of an angular orientation of the housing with respect to gravity, and a processing circuit; aiming the visible light marker at a predetermined external position, while holding the housing at a user-desired orientation; determining substantially a first distance between the second laser light photosensor and the predetermined external position, by use of the distance measuring device; determining substantially a second distance of the laser light receiver with respect to the beam of laser light energy; and determining substantially a relative elevation, based upon the first distance and the second distance.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Figure 1:
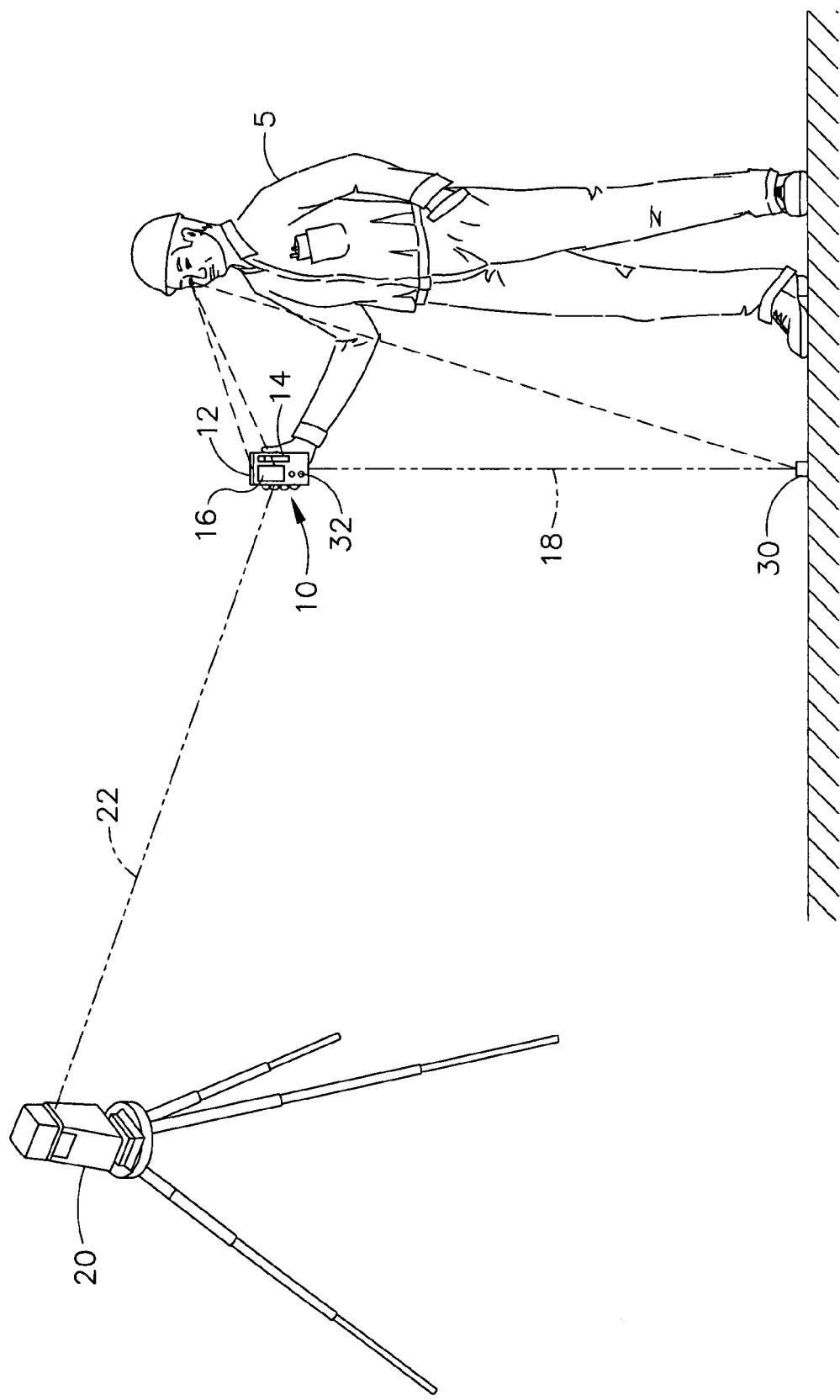
FIG. 1 is a diagrammatic view of a laser receiver unit as constructed according to the principles of the present invention, being held by a human user, and intercepting a rotating beam of laser light, to determine a vertical distance to a predetermined target.

Reference will now be made in detail to the present preferred embodiment of the invention, an example of which is illustrated in the accompanying drawings, wherein like numerals indicate the same elements throughout the views.

The present invention was conceived to address some of the imperfections of the method described in the above Background of the Invention. The present invention uses a laser distance meter (an "LDM") as part of a device that measures the distance from the laser plane to the point to be measured. Several embodiments of the invention are discussed below, and include improvements that relax some of the rigorous requirements of the conventional methods. By using a receiver technology that allows accurate measurement of the position of the laser strike over a large reception range, the user can be freed of the necessity to hold the receiver exactly on the on-grade position. By using an internal gravity reference, the user can be freed from the necessity of holding the rod and receiver exactly plumb with respect to gravity. By implementing an algorithm for taking measurements and retaining them, the user can be freed from the constraint of needing to see the display while the measurement is being taken. Each of these individual aspects of the present invention can be utilized alone, or in combination with one another, to provide an improved laser receiver device.

It should be noted that LDMs (laser distance meters) have been available from a number of manufacturers. See, for example, the Trimble model HD150. While some commercially available systems work on direct measurement of time of flight, most systems modulate a beam of laser light electronically and measure the relative phase of the reflected light. Typically, avalanche photodiodes are used as the light sensors, enabling the system to measure distant or dark objects easily, with no need for a special reflective target. LDM products usually feature a visible laser marker to allow the user to see exactly what point will be measured by the system. (The visible laser marker emits a colored light beam that can be pointed by the user directly at the object to be measured.)

A first embodiment of the present invention involves a laser receiver that is integrated with a laser distance meter into a single package as a unitary device. A level bubble is included in the unit to allow the user to plumb the LDM measurement beam with respect to gravity. The laser receiver is a conventional type which can accurately determine the position of the laser plane at just one point, i.e., the on-grade point.

A second embodiment of the present invention is similar to the first unit, except the laser detector is of the type disclosed in U.S. patent application Ser. No. 10/343,538, which is Published Application US 2003/0174305 A1, now U.S. Pat. No. 7,110,092; also see, for example, a laser detector disclosed in PCT publication WO 2006/048007 A1. The laser light sensing device is sometimes referred to by the inventors as a "rod sensor," in which a plastic or glass light conductor is used, in the shape of a rod, and photosensors are provided at the ends of the rod. This type of receiver allows accurate measurement at any point in its effective photocell range, which can be a range of five inches or more.

A third embodiment of the present invention is similar to the second unit, except it substitutes an electronic gravity reference for a visual level bubble. This gravity reference connects to the main position processor to allow it to mathematically compensate for out of plumb conditions.

A fourth embodiment of the present invention is similar to the third unit, except that it incorporates a switch, and includes a software algorithm that allows the user to place the unit in a mode where it will take continue taking measurements (as periodic samples) so long as certain conditions are met. These conditions can include the following: (1) the gravity reference is stable within a predetermined tolerance; and (2) the laser receiver is receiving laser strikes at time intervals that are within a predetermined "time window" tolerance. When the conditions are no longer met, the last valid reading is retained, and can be utilized by the user to determine a relative elevation.

A fifth embodiment of the present invention is similar to the fourth unit, except that it incorporates a GPS receiver, which by itself can provide a three-dimension positional fix. However, in GPS receivers the vertical dimension (elevation or altitude) is much less accurate than the horizontal plane dimensions (longitude and latitude), and the laser receiver circuit provides a much more accurate vertical position than is possible with the GPS receiver alone. Therefore, the fifth embodiment provides three-dimension positional information that is quite accurate in all directions, by using a position controller and control software that acquires the longitude and latitude data from the GPS receiver, but acquires the elevation/altitude data from the laser receiver circuit (instead of from the GPS receiver).

Referring now to the drawings, FIG. 1 diagrammatically shows a possible use of the first embodiment of the present invention. A user 5 is holding a laser receiver unit 10 in the transmitter laser plane 22 at the on-grade position (indicated by a visual display 16), and is also watching the bubble of a level vial 12 to insure that the housing of laser receiver unit 10 is plumb. Finally, the user is also watching a "marker" laser beam 18 on the ground to be sure that it is aimed on the desired object 30 (or "target") being measured. A button press (e.g., using a small pushbutton switch 32) takes the measurement. More typically, the user would mount the laser receiver on a pole to make it easier to hold it steady. Reference number 20 depicts a laser transmitter which generates the plane of light. The rotating laser light plane 22 impacts on an array of photosensors 14, which typically are photodiodes.

Figure 2:
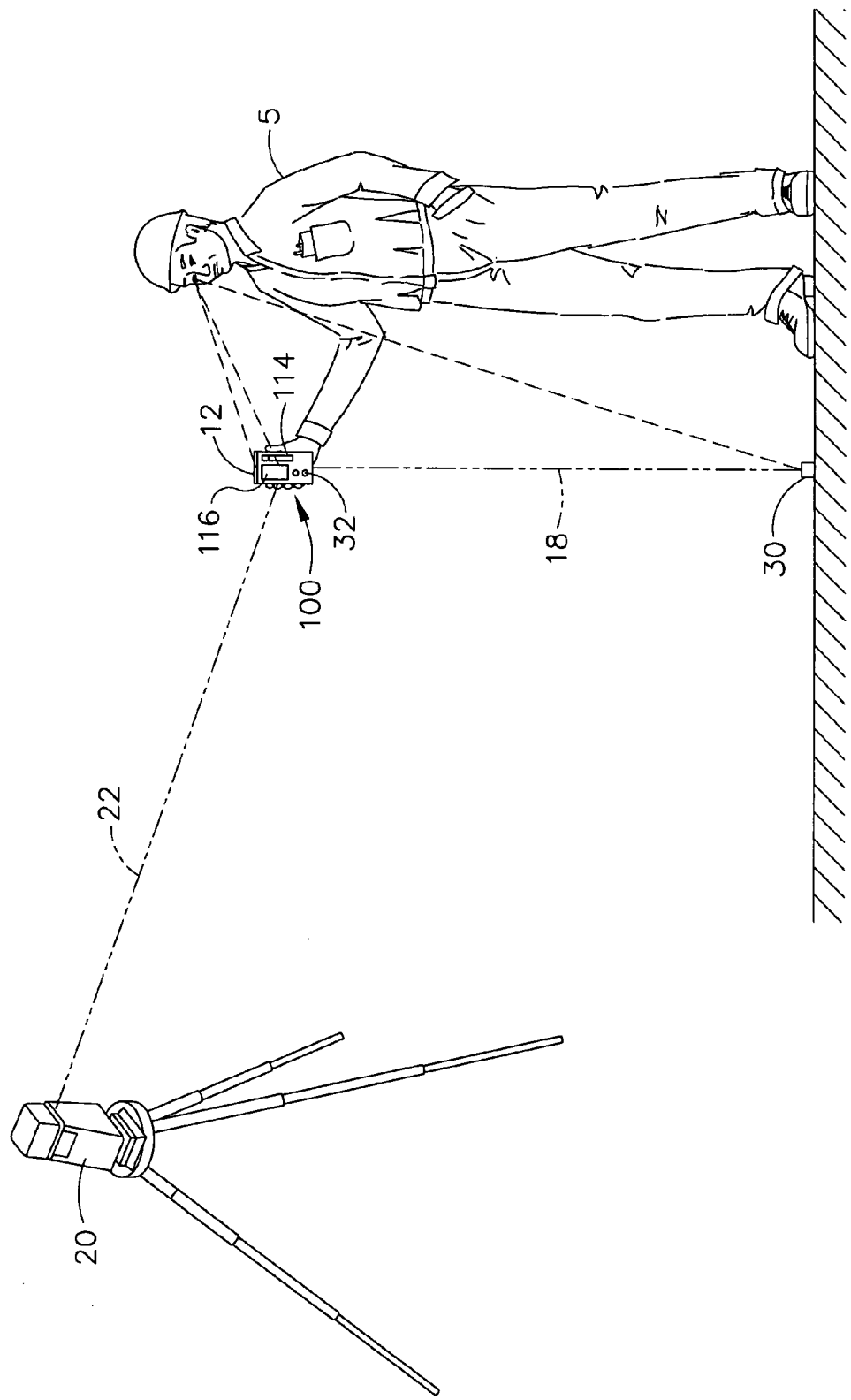
FIG. 2 is a diagrammatic view of a laser receiver unit as constructed according to the principles of the present invention, being held by a human user, and intercepting a rotating beam of laser light, to determine a vertical distance to a predetermined target, in which the photodetector of the laser receiver unit is such that it does not need to be on-grade with the laser light beam, but merely needs to intercept that laser light beam anywhere within the photosensor's receiving range.

FIG. 2 diagrammatically shows a user 5 operating the second embodiment of the present invention. This arrangement is quite similar to that depicted in FIG. 1, except that the laser light plane 22 (output by a rotating laser transmitter 20) does not intersect the laser receiver unit 100 at the on-grade position. With this type of laser receiver, the user need only get the sensing portion of the laser receiver unit somewhere in the rotating laser beam. The receiver 100 can use a different style of photosensor 114, which is described below in greater detail. However, the laser receiver unit's housing is still held plumb (using a level vial 12) and the marker laser 18 must fall on the target 30. A button press (e.g., using a small pushbutton switch 32) takes the measurement.

Figure 3:
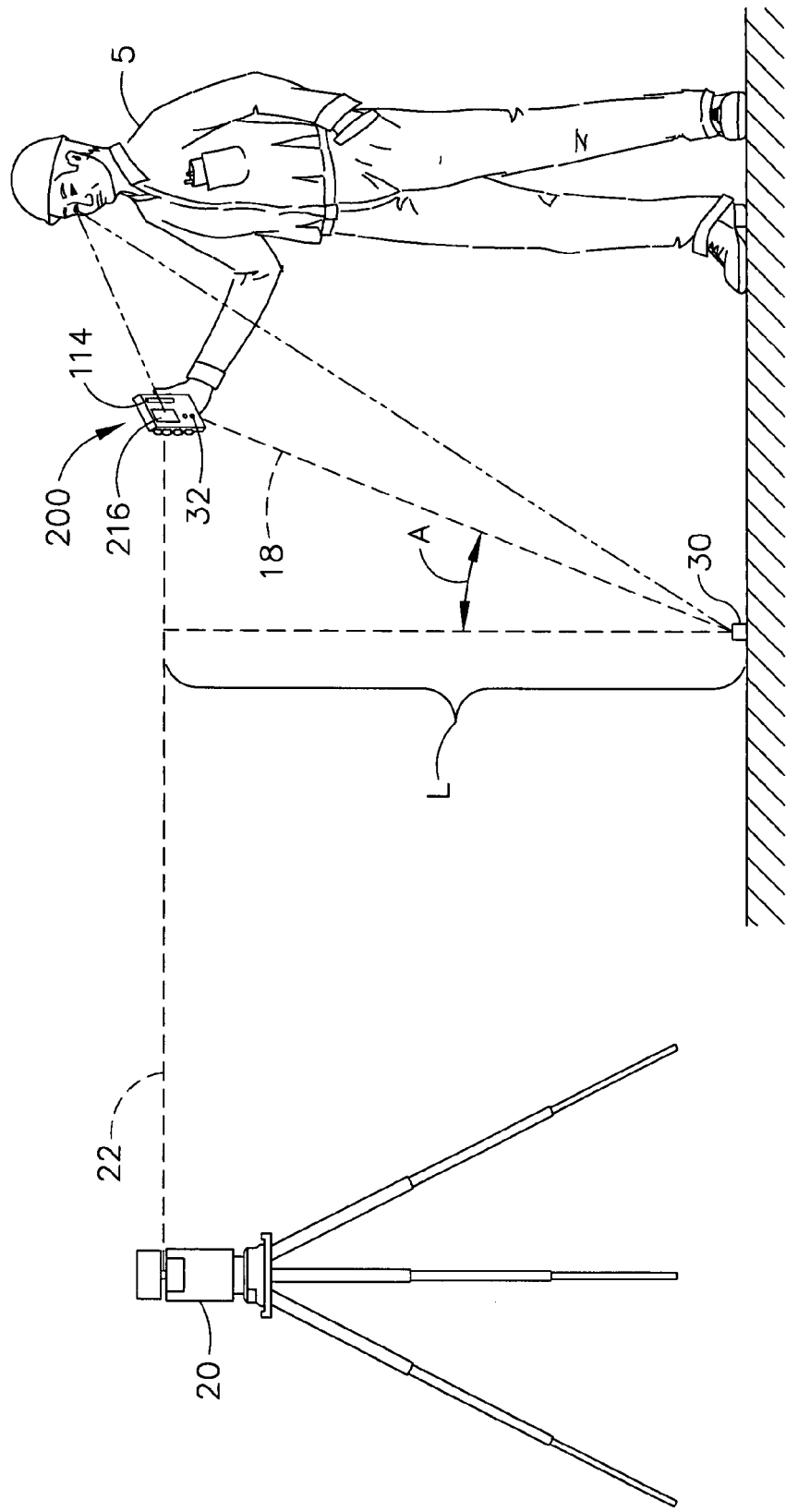
FIG. 3 is a diagrammatic view of a laser receiver unit as constructed according to the principles of the present invention, being held by a human user, and intercepting a rotating beam of laser light, to determine a vertical distance to a predetermined target, in which the photodetector of the laser receiver unit is such that it does not need to be on-grade with the laser light beam, but merely needs to intercept that laser light beam anywhere within the photosensor's receiving range, and further a gravity reference device is included in the laser receiver unit to allow the receiver unit to be positioned at an angle that is not plumb with respect to the desired target.

FIG. 3 diagrammatically shows a user operating the third embodiment of the present invention. In this embodiment, there is no visible level vial on the housing. Its function has been taken over by an internal gravity reference device 246. Because of this, the user 5 can hold the laser receiver unit 200 at an angle "A" with respect to plumb and still get accurate results for the relative elevation. A button press (e.g., using a small pushbutton switch 32) takes the measurement.

When in use, the user 5 presses an operator key 32 (or a small pushbutton switch 32) when the marker laser beam 18 is properly aimed at the selected target 30. At that moment, the gravity reference sensor 246 will be detecting the angle A with respect to the vertical (i.e., the plumb angle), and the vertical distance "L" can automatically be determined by the laser distance measurement device 50 signal to the position processor 240 (along with the knowledge of angle A).

In the laser receiver 200, the photodetector 114 can either be an array of photocells, for example, or more preferably one of the rod sensors that is described below in greater detail. This will allow the user to hold the laser receiver device 200 in a position that is not necessarily in the on-grade position, but instead the rotating laser light beam 22 merely needs to intersect the photodetector 114 anywhere along its possible sensing position capabilities.

Figure 4:
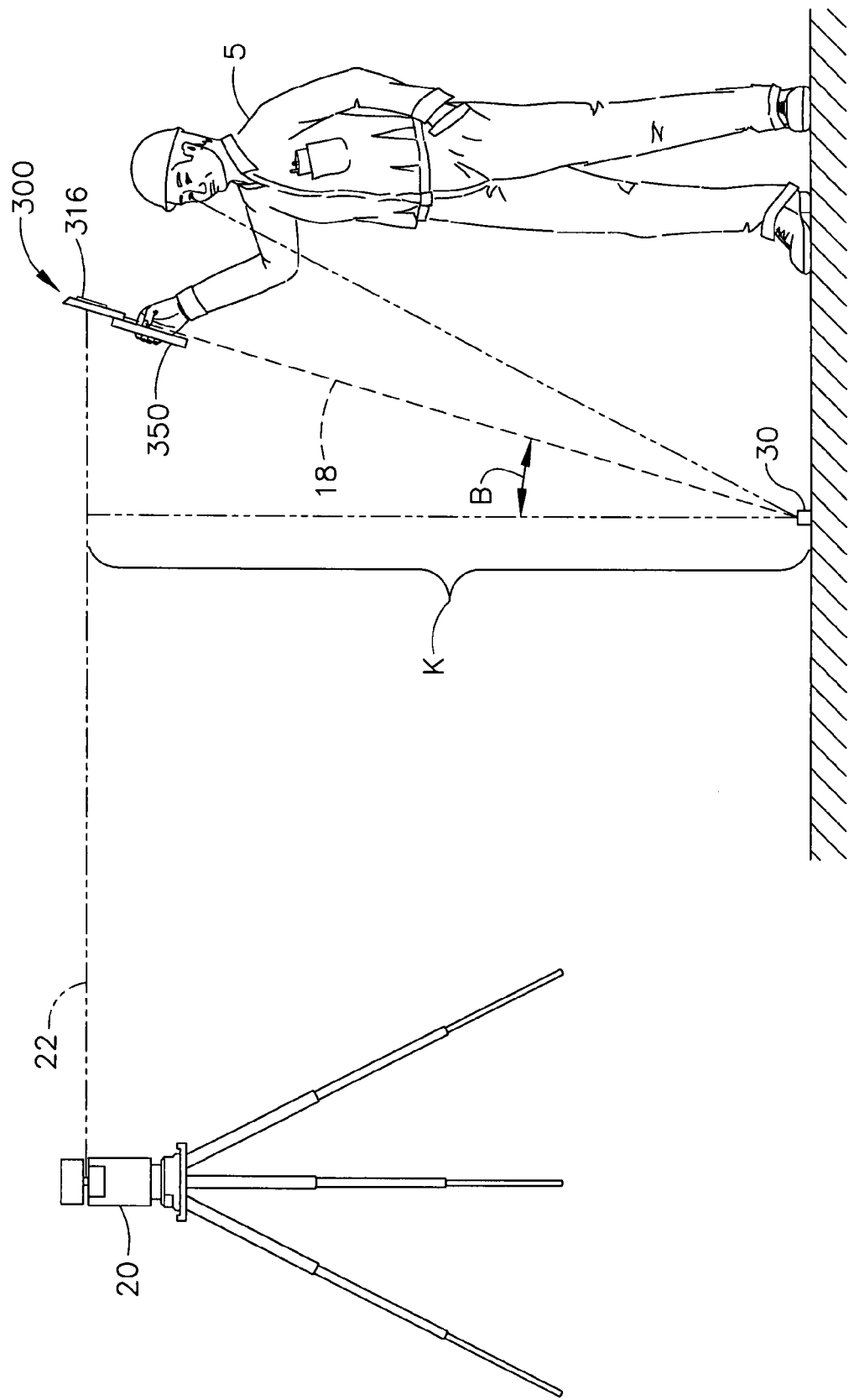
FIG. 4 is a diagrammatic view of a laser receiver unit as constructed according to the principles of the present invention, being held by a human user, and intercepting a rotating beam of laser light, to determine a vertical distance to a predetermined target, in which the photodetector of the laser receiver unit is such that it does not need to be on-grade with the laser light beam, but merely needs to intercept that laser light beam anywhere within the photosensor's receiving range, and further a gravity reference device is included in the laser receiver unit to allow the receiver unit to be positioned at an angle that is not plumb with respect to the desired target, and moreover the receiver unit has an automatic measurement mode that allows the laser receiver unit to be placed in positions where the human user cannot necessarily see the display of the receiver unit.

FIG. 4 diagrammatically shows the user operating the fourth embodiment of the present invention. In this embodiment, the laser receiver unit 300 can be held over the user's head, possibly out of reach as well as out of sight. The unit automatically takes repeated measurements as the user points the marker laser 18 on the object 30 to be measured. Note that, in this example, the user 5 could measure an object that would be inaccessible by conventional techniques, where visual access to the laser receiver is blocked by an overhang, for example. The user 5 listens to audible feedback being output by a piezo-electric device 60 on the housing of laser receiver unit 300 while the measurements are being made, and while the user aims the marker laser beam 18 on the desired target 30. Once the user 5 has achieved a "good" measurement, the laser receiver unit 300 can be removed from the laser light plane 22, and the user 5 can then read the relative elevation measurement now being displayed on a digital indicator 316.

When using the fourth embodiment of the present invention, generally designated by the reference numeral 300, the user 5 is not required to be able to visually see the actual receiver 300 or any particular portion of the display 316. Moreover, a special handle 350 can be attached to the housing of receiver unit 300 to allow the user 5 to extend the receiver unit 300 to an even greater elevation above the user's head, or to allow the user to place the receiver unit 300 in a location that would otherwise be difficult to get at due to other obstacles. In any event, since there is a gravity reference device 246 and a laser distance measurement device 50 included with the receiver unit 300, the user can automatically determine the vertical distance "K" of receiver unit 300 as it intersects the laser light plane 22 being generated by the rotating laser transmitter 20. This measurement mode can be made "fully automatic," which will be discussed below in greater detail.

Figure 5:
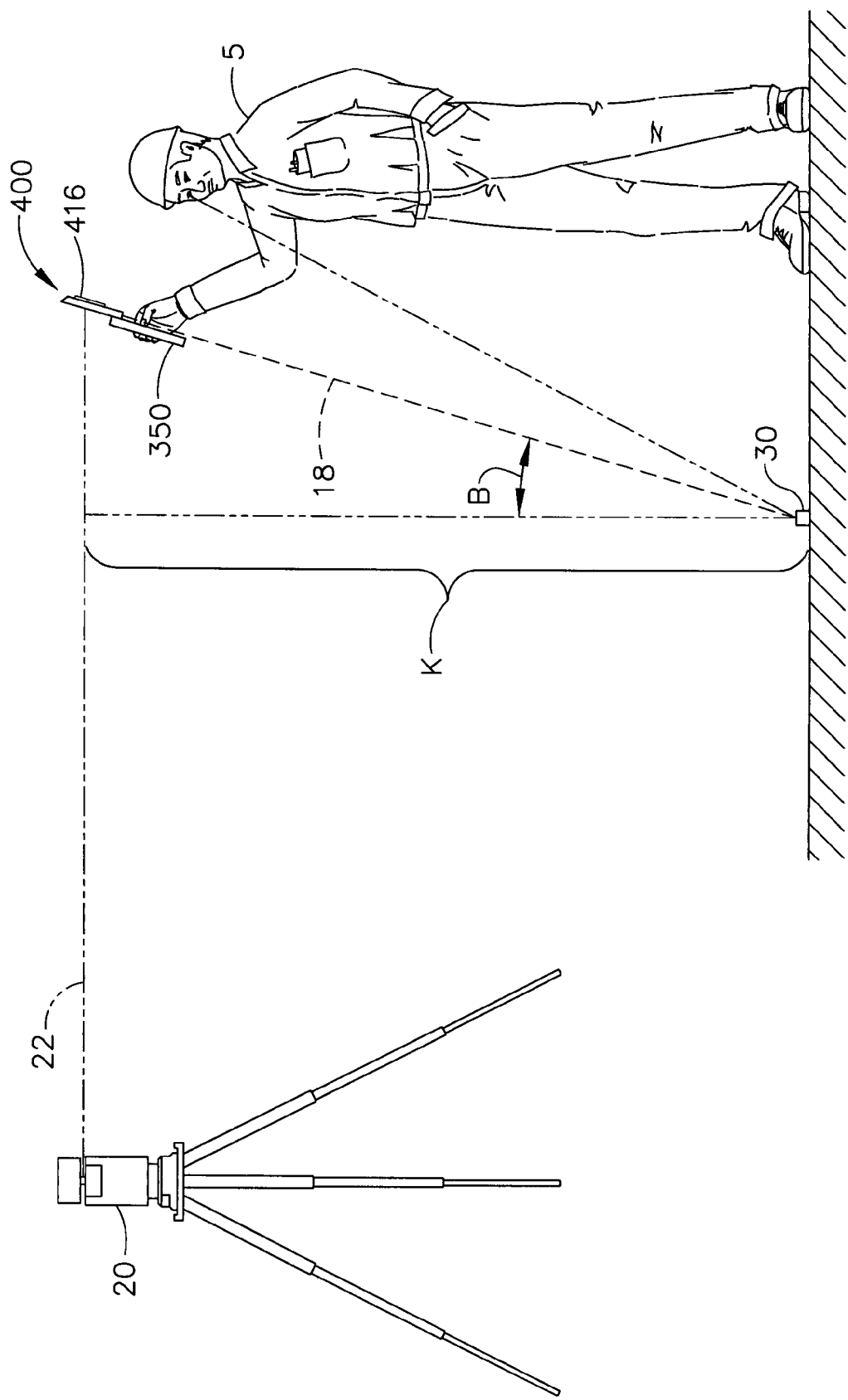
FIG. 5 is a diagrammatic view of a laser receiver unit as constructed according to the principles of the present invention, being held by a human user, and intercepting a rotating beam of laser light, to determine a vertical distance to a predetermined target, in which the photodetector of the laser receiver circuit is such that it does not need to be on-grade with the laser light beam, but merely needs to intercept that laser light beam anywhere within the photosensor's receiving range, and further a gravity reference device is included in the laser receiver unit to allow the receiver unit to be positioned at an angle that is not plumb with respect to the desired target, and moreover the receiver unit has an automatic measurement mode that allows the laser receiver unit to be placed in positions where the human user cannot necessarily see the display of the receiver unit; furthermore, a Global Positioning Sensor (GPS) receiver is included to detect a position in the plane that is parallel to the Earth's surface, and that information is combined with the vertical (elevation) information from the laser receiver circuit to obtain a more accurate three-dimensional position fix.

FIG. 5 is generally based upon the circuit design illustrated in FIG. 4. However, a Global Positioning Sensor (GPS) circuit is added for the purpose of providing latitude and longitude information. Of course, GPS circuits are capable of providing information about the third dimension, elevation/altitude, as well, and in the field of construction, the use of GPS capabilities for survey and machine control is well known. However, due to technical limitations in GPS receivers, the vertical accuracy is at least a factor of two (2) worse than the accuracy in the plane parallel to the Earth's surface. In construction work, the vertical dimension often is the most important.

In FIG. 4, a special laser receiver position processor circuit 340 (see FIG. 9) was used to accurately measure the position on a laser receiver 300 that intersects a laser plane. By also measuring angle of the rod/handle 350 with respect to gravity, the height of any point can be established to within millimeters. In FIG. 5, this capability is combined with a GPS receiver 460 (see FIG. 10) to create the fifth embodiment laser receiver unit 400, and using the GPS output data, a point can be located in space within centimeters in any horizontal direction and within millimeters in the vertical direction. The laser receiver's position processor circuit 440 (see FIG. 10) will use the corrected elevation data provided by the combination of the photodetector 114, gravity reference device 246, and laser distance measurement device 50; and it will also use the "horizontal plane" information provided by the GPS receiver 460, thus now being capable of determining its position in all three dimensions.

For example, a surveying application may directly use this three-dimension positional information to store coordinates corresponding to the location of various objects. A construction application may beneficially use this information to produce or construct useful objects, such as a parking lot, for example. Most users find standing water in parking lots to be an irritation, so the design of a parking lot should seek to minimize this problem. One strategy is to provide drains at intervals. Near the drain, all sides of the parking lot slope toward that drain for a certain distance until reaching the midpoint to the next drain. Because, when using conventional means, it takes a very skilled operator to produce such a profile, many parking lots fail to meet this ideal. However, if the earthmoving machine that prepares the base for such a parking lot could be controlled in three-dimensional space, it would be easy to produce such a parking lot. The operator would be able to merely drive through the pertinent construction area, and the blade could be controlled to automatically move in a manner to produce the desired result.

For example, the laser receiver 400 could be used as the "transducer" to provide the three-dimensional information to the control system for automatically positioning the blade. If the parking lot is a centimeter or so larger or smaller, it is of little concern. But the drainage of the water often depends critically on controlling the vertical dimension to a desired tolerance within millimeters. And because the slope for drainage is so small (i.e., the sloped surface's angle is small compared to the horizontal plane), a slight error in horizontal position results only in very small vertical errors. Thus the measurement characteristics of the laser receiver 400 should fit quite well with the practical requirements for a three-dimensional position transducer to be used in these types of construction applications.

Figure 6:
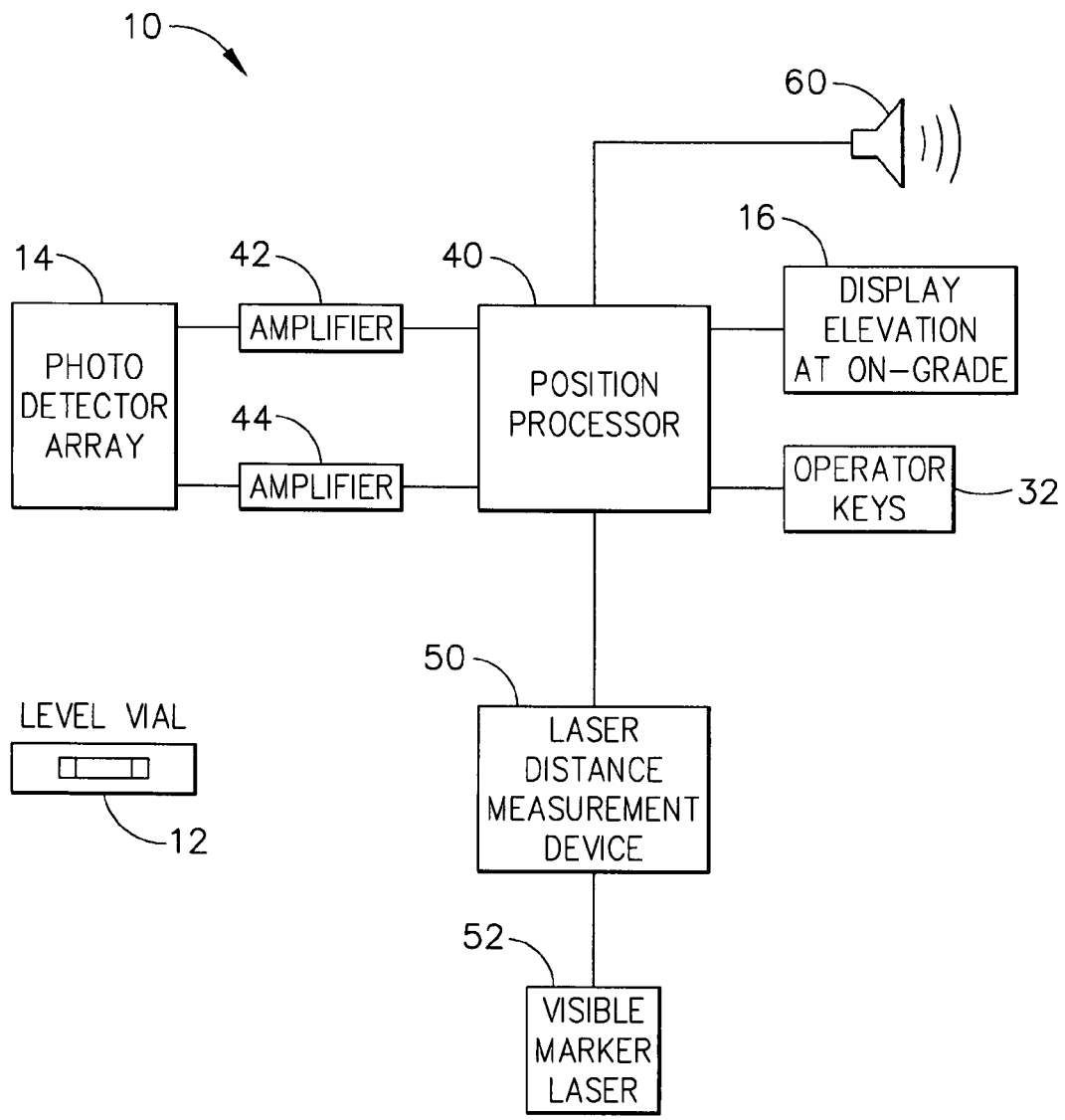
FIG. 6 is a block diagram of the major hardware components of a laser receiver unit, as constructed according to the principles of the present invention, which can be used in the distance measuring application depicted in FIG. 1.

FIG. 6 depicts the major components of the electronic hardware, as a block diagram, for the first embodiment 10 of the present invention. The photodiode array 14 produces one or more signals which are amplified and supplied to a position processor 40 (e.g., a microprocessor or other type of computing device). A laser distance measurement (LDM) device 50 with its associated visible marking laser 52 is also connected to the position processor 40.

It should be noted that the amplifiers 42 and 44 are utilized to create two different "channels" of electrical signals that are received from the photodetector array 14. The signals produced by the photodetector array 14 can be signal conditioned and amplified in many different ways to achieve various beneficial effects in a laser receiver product. Many different types of amplifier circuits have been used in the past for laser receivers to create signals that can be directed to a position processor device, such as the position processor 40 in the present invention. There are many examples of different types of amplifier circuits, including those patented by Apache Technologies, Inc. of Dayton, Ohio. A list of such patent properties is included below, and these patent properties are incorporated herein by reference.

The position processor 40 also receives inputs from an operator keypad 32. Using this information, the position processor drives an acoustical output device 60 (a piezo-electric speaker, for example) and a display. The acoustic output device informs the operator whether the detector is above grade, below grade, or on-grade. The acoustic output device also makes a special sound when a laser distance measurement is correctly made, and the elevation display 16 shows the distance that was measured. A level vial 12 is also included to serve the operator as a visual indication of whether the device is plumb.

The level vial 12 is a visual hardware device, and has no electrical inputs or outputs. Therefore, it is illustrated on the block diagram of FIG. 6, but there are no signal connections to or from the level vial.

Figure 7:
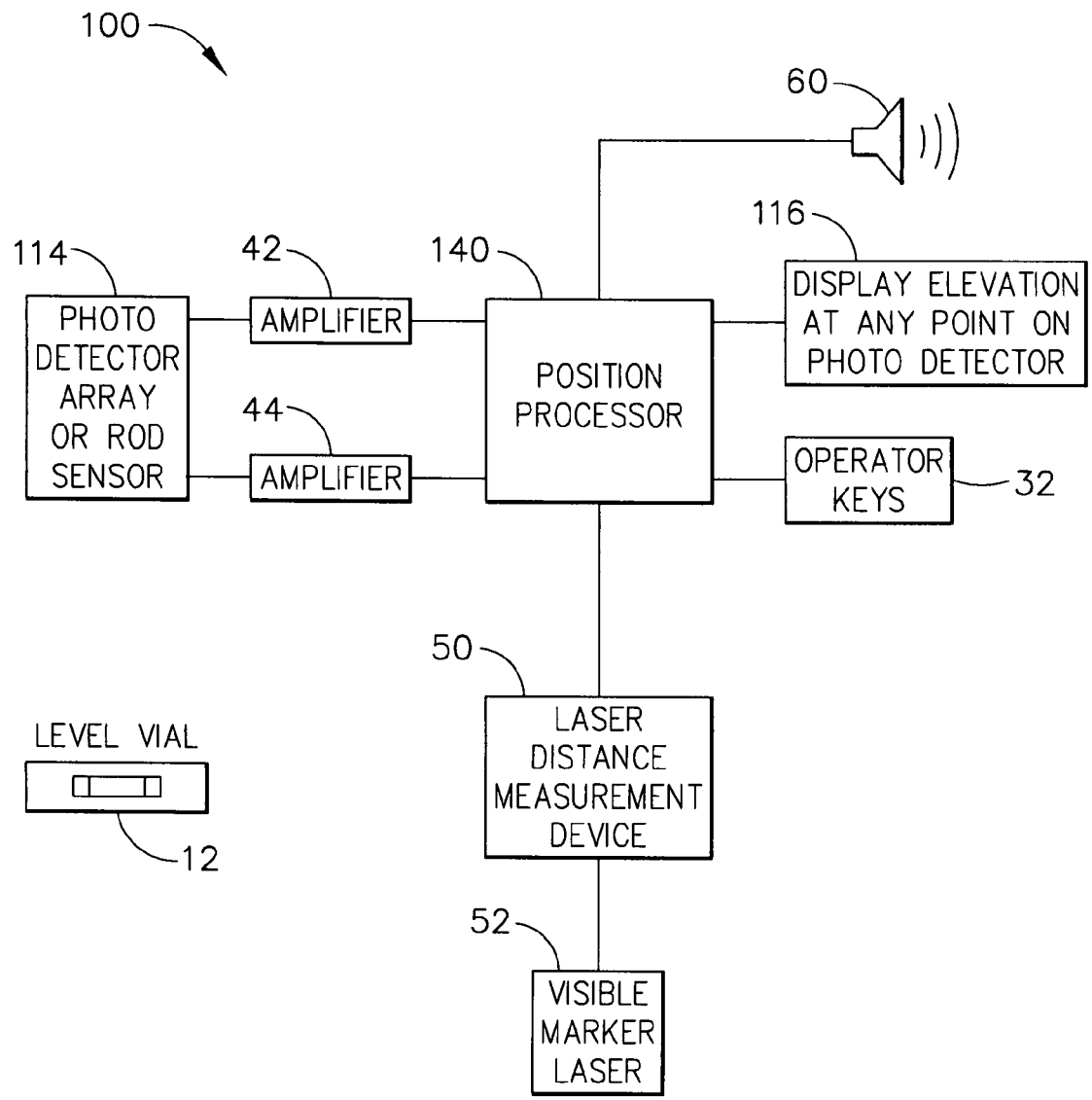
FIG. 7 is a block diagram of the major hardware components of a laser receiver unit, as constructed according to the principles of the present invention, which can be used in the distance measuring application depicted in FIG. 2.

FIG. 7 depicts the major components of the electronic hardware, as a block diagram, for the second embodiment 100 of the present invention. In this embodiment, there could be a specially-connected photodiode array 114, or there could be no photodiode "array" as such, but instead a "rod sensor" 114 could be provided. A preferred laser light "rod sensor" is a special type of laser light sensor that is able to accurately measure the position of the beam impact, anywhere in the sensor's effective detection range, which is typically more than 4 inches (10 cm) in vertical distance. An example of this type of rod sensor laser light sensor is disclosed in Published Application US 2003/0174305 A1 (now U.S. Pat. No. 7,110,092); and also, see PCT publication WO 2006/048007 A1. The rod sensor 114 produces one or more signals which are amplified (by amplifiers 42 and 44) and supplied to a position processor 140. A laser distance measurement (LDM) device 50, with its associated visible marking laser 52, is also connected to the position processor 140.

The position processor 140 combines data from the rod sensor device 114 and the laser distance meter 50 to compute the elevation of the target point. The position processor also receives inputs from an operator keypad 32. Using this information, the position processor drives an acoustical output device 60 (a piezo-electric speaker, for example) and an elevation display 116. The acoustic output device 60 informs the operator whether the detector is above grade, below grade, or on-grade. It also makes a special sound when a laser distance measurement is correctly made, and the display 116 shows the distance that was measured. A level vial 12 is also included to serve the operator as a visual indication of whether the device is plumb.

Figure 8:
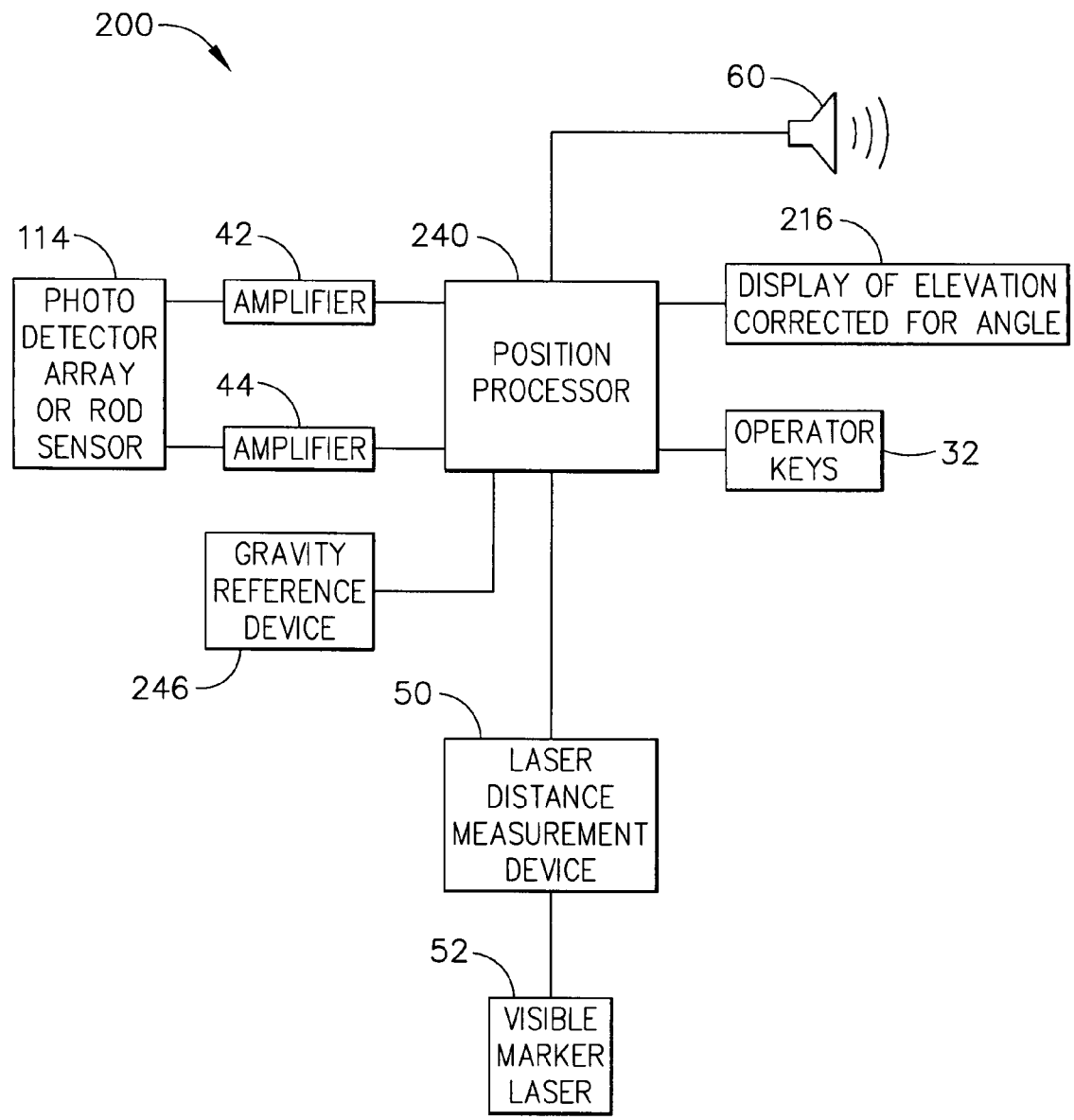
FIG. 8 is a block diagram of the major hardware components of a laser receiver unit, as constructed according to the principles of the present invention, which can be used in the distance measuring application depicted in FIG. 3.

FIG. 8 depicts the major components of the electronic hardware, as a block diagram, for the third embodiment 200 of the present invention. In this embodiment, the "rod sensor" 114 discussed above again can be provided, which is a special type of laser light sensor that is able to accurately measure the position of the beam anywhere in its effective range, which is typically more than 4 inches (10 cm) in vertical distance. (See Published Application US 2003/0174305 A1 (now U.S. Pat. No. 7,110,092), and also PCT publication WO 2006/048007 A1.) The rod sensor 114 produces one or more signals which are amplified (by amplifiers 42 and 44) and supplied to a position processor 240.

A laser distance measurement (LDM) device 50 with its associated visible marking laser 52 is also connected to the position processor 240. A gravity reference sensor 246 makes measurements which can be used to automatically compute the angle of the device with respect to gravity—note: this is angle "A" on FIG. 3. The position processor 240 combines data from the photodiode array 114 (or rod sensor), the laser distance meter 50, and the gravity reference sensor 246 to compute the elevation of the target point, a distance "L" on FIG. 3. The position processor 240 receives inputs from an operator keypad 32. Using this information, position processor 240 drives an acoustical output device 60 (a piezo-electric speaker, for example) and a display 216. The acoustic output device 60 informs the operator whether the detector is above grade, below grade, or on-grade. It also makes a special sound when a laser distance measurement is correctly made, and the elevation display 216 shows the distance (L) that was measured.

Figure 9:
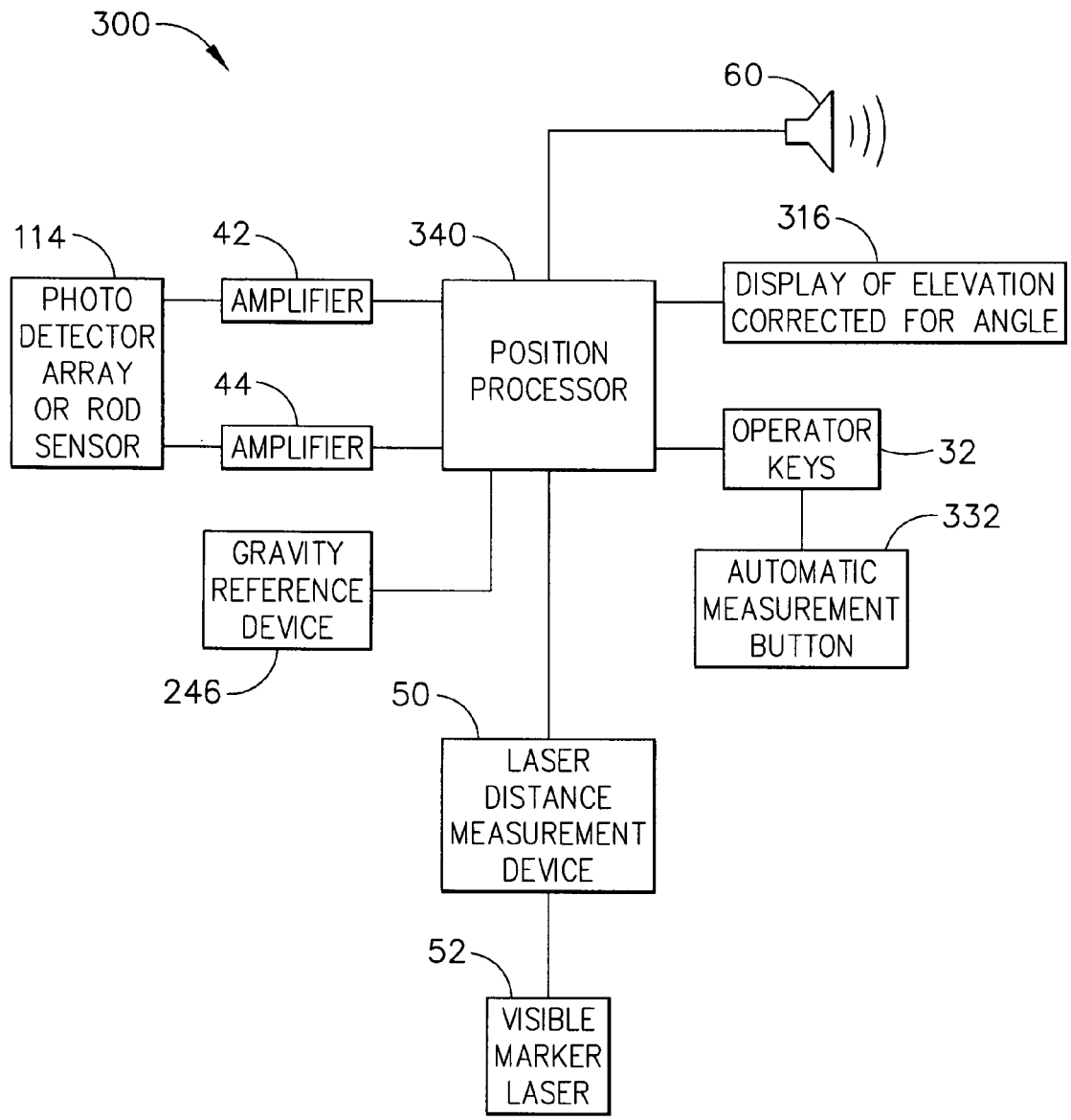
FIG. 9 is a block diagram of the major hardware components of a laser receiver unit, as constructed according to the principles of the present invention, which can be used in the distance measuring application depicted in FIG. 4.

FIG. 9 depicts the major components of the electronic hardware, as a block diagram, for the fourth embodiment 300 of the present invention. In this embodiment, the "rod sensor" 114 discussed above again can be provided, which is a special type of laser light sensor that is able to accurately measure the position of the beam anywhere in its effective range, which is typically more than 4 inches (10 cm) in vertical distance. (See Published Application US 2003/0174305 A1 (now U.S. Pat. No. 7,110,092), and also PCT publication WO 2006/048007 A1.) The rod sensor 114 produces one or more signals which are amplified (by amplifiers 42 and 44) and supplied to a position processor 340.

A laser distance measurement (LDM) device 50 with its associated visible marking laser 52 is also connected to the position processor 340. A gravity reference sensor 246 makes measurements which can be used to compute the angle of the device (i.e., angle "B" on FIG. 4) with respect to gravity. The position processor 340 combines data from the rod sensor device 114 (or a photodiode array), the laser distance meter 50, and the gravity reference sensor 246 to compute the elevation of the target point. The position processor receives inputs from an operator keypad 32. Using this information, the position processor drives an acoustical output device 60 (a piezoelectric speaker, for example) and a display. The acoustic output device 60 informs the operator 5 whether the detector is above grade, below grade, or on-grade. It also makes a special sound when a laser distance measurement is correctly made, and the elevation display 316 shows the distance (i.e., distance "K" on FIG. 4) that was measured.

In addition to the above, in this fourth embodiment, a special key 332 (or a key sequence using the keypad 32) can be used to place the receiver unit 300 in an automatic measurement mode, such that repeated measurements are made (or "sampled") at specified intervals whenever certain predetermined conditions are met. These conditions can be, for example, when the gravity reference sensor 246 is stable and the receiver is in the transmitter laser level plane 22. Once the user hears the "special sound" noted above, he or she knows that a "good sample" has been taken by the receiver unit 300, and he/she can then move the receiver 300 from the laser plane 22. This action will terminate the previous status of being with the "certain predetermined conditions," and the laser receiver unit 300 will automatically stop taking new samples, and now will "memorize" the most recent sample and display that value on the digital readout 316 for the user 5.

Figure 10:
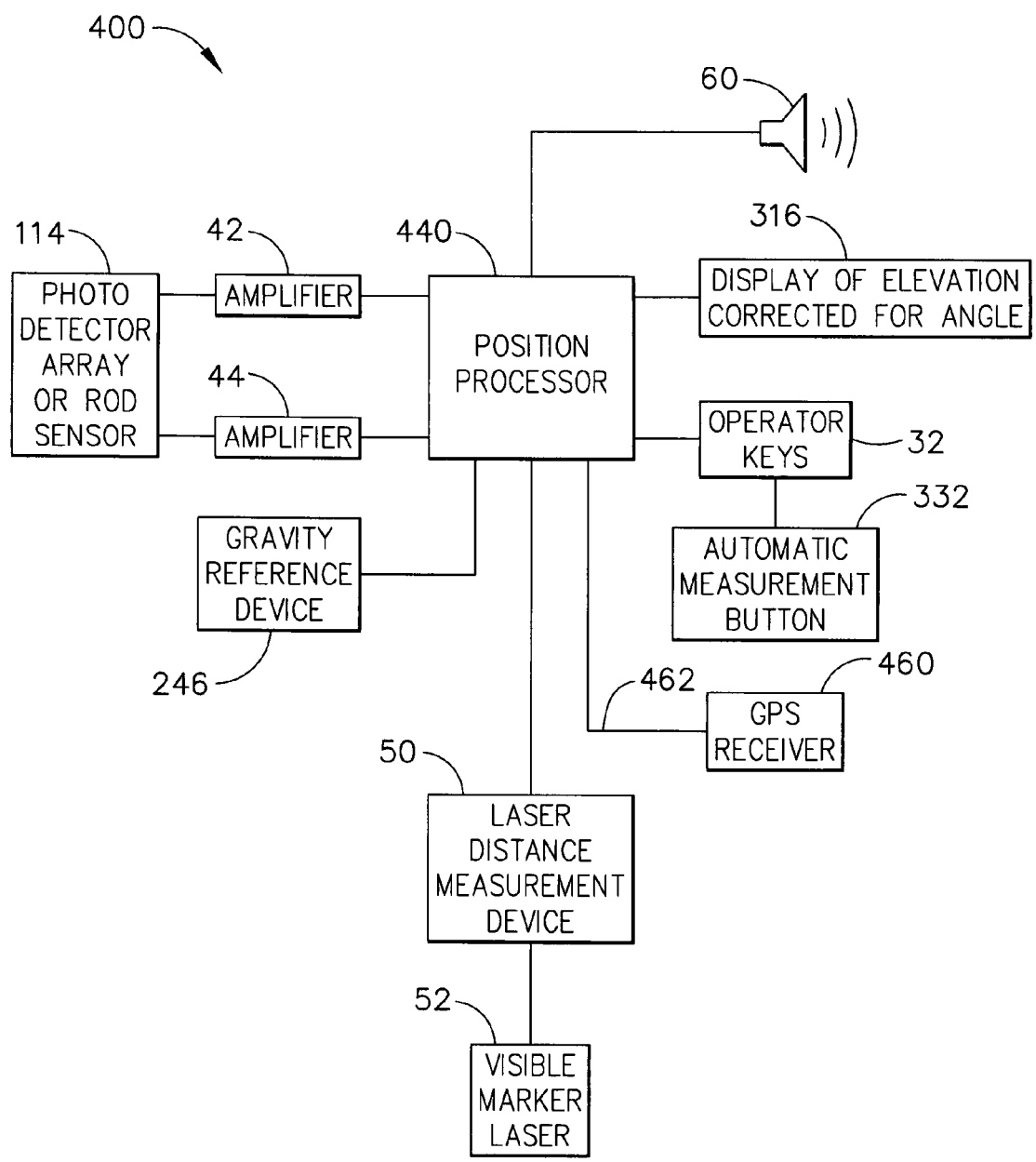
FIG. 10 is a block diagram of the major hardware components of a laser receiver unit, as constructed according to the principles of the present invention, which can be used in the three-dimensional position measuring application depicted in FIG. 5.

FIG. 10 depicts the same type of laser receiver circuit as was described in FIG. 9, with the addition of a GPS receiver circuit 460, which represents a fifth embodiment of the present invention, generally designated by the reference numeral 400. The laser receiver circuit 340 of FIG. 9 can accurately determine an elevation of interest within millimeters, whereas a GPS receiver is not nearly that accurate in the vertical dimension (i.e., perpendicular to the Earth's surface). On the other hand, a GPS receiver is typically at least twice as accurate in determining a horizontal position (i.e., a point in the plane that is parallel to the Earth's surface) than it is in determining the vertical position. Therefore, a combination of the laser receiver circuit 340 of FIG. 9 and a GPS receiver will provide a more accurate instrument for determining three-dimensional positions.

In one mode of the invention, the GPS receiver 460 of FIG. 10 could be a stand-alone unit that has an electronic output signal containing positional information for three dimensions (3-D) and outputs that 3-D data to another instrument; or more preferred, it could be a module that is designed for interfacing directly with a microprocessor or microcontroller integrated circuit chip, in which the three-dimension positional data signal from the GPS receiver module 460 is directed along a circuit pathway 462. The position processor 440 will use the horizontal position information (e.g., latitude and longitude) received from the circuit pathway 462, but will ignore the height (elevation/altitude) information sent by the GPS receiver 460. Instead, the position processor 440 operates by executing software that will use the elevation information that has been determined by the photodetector 114, the laser distance measurement device 50, and the gravity reference device 246. The result is a more accurate vertical position, and this combination of information creates a three-dimension positional fix, which can be used on a construction jobsite for various purposes, as discussed above.

It should be noted that the GPS receiver depicted in FIG. 10 can also be used in combination with the other embodiments of the present invention, for example, the embodiments depicted in FIG. 6, FIG. 7, or FIG. 8. Of course, such alternative embodiments would have certain limitations as compared to that of the embodiment of FIG. 10, but a three-positional fix could nevertheless be obtained, having a more accurate vertical component that that which is available from a GPS receiver alone.

The terminology used in the claims includes the following phrases that include, but are not restricted to, the following meanings:

(a) The "first distance" refers to the distance that is determined by the LDM unit (using its visible light marker/laser spotter), such as the distance 18 on FIG. 1 or FIG. 3. This first distance is preferably in the vertical direction only, using a tilt device to indicate or correct for angular tilt. The "tilt device" could be a mechanical device such as a level vial, or it could be an automatic sensing device such as a gravity sensor. In the embodiments that use a gravity sensor and thus can have automatic compensation for angular tilt, the first distance typically will be "corrected" by another (angle) signal derived from the gravity sensor, so that the corrected first distance represents only the vertical component of the actual distance that is measured by the LDM (such as the distance "L" on FIG. 3). It should be noted, however, that there would be an inherent additional small distance "built-in" to the first distance value to represent the vertical distance between the bottom of the housing (which is where the LDM would typically be located) and the "on-grade position" of the photodetectors that intercept the laser light beams. This additional built-in small distance could be automatically corrected (compensated) by the gravity sensor's output signal (if a gravity sensor is part of the laser receiver), so that only the vertical component of the additional built-in small distance is used for this first distance calculation.

(b) The "second distance" refers to the actual (vertical) distance between the laser receiver's "on-grade position" (assuming the laser receiver is not currently at the "on-grade position") and the plane of rotating laser light. For example, if the laser receiver is currently at the on-grade position, then the second distance would be equal to zero. In an actual laser receiver, the second distance typically would be a relatively short distance, no greater than the actual length (or height) of the photodetector built into the laser receiver. This second distance could also be automatically corrected (compensated) for a non-vertical orientation of the housing when the reading is taken, if the housing also contains a gravity sensor.

(c) The "relative location" refers to the current position of the laser receiver with respect to the plane of rotating laser light. Typically this information is presented as being "on-grade", "above grade", or "below grade". Conceptually, this is the same physical parameter as the "second distance" referred to above, however, the relative location does not necessarily provide (or attempt to determine) the actual distance between an above grade position and the laser plane, for example. Instead, this parameter is sometimes (or often) presented on the display of many commercially available laser receivers merely as an above grade or below grade state, but the amount (i.e., the actual distance) of "above" or "below" is not necessarily known.

(d) The "relative elevation" can refer to more than one parameter. In general, the relative elevation is the vertical distance between the external position (the spot where the LDM's visible light marker is "painted") and the plane of rotating laser light. However, this relative elevation could have other meanings, if desired, such as the elevation of the external position with respect to sea level, or the elevation above sea level of the laser receiver's housing, or the differential elevation of the laser receiver's housing with respect to the above-noted "external position," or the differential elevation of the laser receiver's housing with respect to the above-noted plane of rotating laser light. If the relative elevation is to be displayed with respect to sea level, then sea level elevation of the external laser light source (e.g., a rotating laser beam that creates a plane of laser light) will need to be known, and that information would also need to be transmitted or programmed into the laser receiver unit. Potentially, that sea level elevation information could instead be determined using a GPS receiver built into the laser receiver unit, but that GPS vertical position (or altitude) information would be less accurate than the "normal" laser receiver capabilities of determining elevation.

It will be understood that an array of photodiodes and amplifier units can be used along with a corresponding "special" position processor, in lieu of the rod sensor 114 that is discussed in reference to the above second, third, and fourth embodiments of the present invention, without departing from the principles of the present invention. These "special" devices would make it possible for the laser receiver units 100, 200, or 300 to intercept the rotating laser light beam 22 at other grade positions than on-grade, and still successfully operate.

It will also be understood that the logical operations described in relation to the processing circuitry of the present invention can be implemented using sequential logic, such as by using microprocessor technology, or using a logic state machine, or perhaps by discrete logic; it even could be implemented using parallel processors. One embodiment may use a microprocessor or microcontroller to execute software instructions that are stored in memory cells within an ASIC. In fact, the entire microprocessor or a microcontroller, along with RAM and executable ROM, possibly could be contained within a single ASIC, in one mode of the present invention. Of course, other types of circuitry could be used to implement these logical operations depicted in the drawings without departing from the principles of the present invention.

Various types of laser receiver amplifier and sensitivity circuits could be used in conjunction with the present invention, many of which are already patented, and some of which have patent applications now pending. Examples of such patents and applications include United States patents assigned to Apache Technologies, Inc. of Dayton, Ohio, include U.S. Pat. No. 7,012,237, for a Modulated Laser Light Detector; U.S. Pat. No. 6,133,991, for a Multi-segment Composite Photocell Device; U.S. Pat. No. 5,486,690, for a Method and Apparatus for Detecting Laser Light; U.S. Pat. No. 5,471,049 for a Light Detecting Apparatus Having Low Noise Automatic Gain Control Circuit; and U.S. Pat. No. 5,343,033, for a Method and Apparatus for Detecting Laser Light Having a Plurality of Pulse Integrator and Automatic Gain Control Circuits. In addition, United States patent applications assigned to Apache Technologies, Inc. of Dayton, Ohio, include U.S. patent application Ser. No. 11/082,041 filed on Mar. 16, 2005; titled Modulated Laser Light Detector With Improved Range; U.S. patent application Ser. No. 11/303,488 filed on Dec. 16, 2005; titled Modulated Laser Light Detector With More Efficient Beam Detection Algorithm; U.S. patent application Ser. No. 10/343,538 filed on Jan. 31, 2003; titled Measuring Device And Measuring Method For Determining Distance And/Or Position; and U.S. patent application Ser. No. 11/414,383 filed on Apr. 28, 2006; titled Modulated Laser Light Detector With Discrete Fourier Transform Algorithm.

All documents cited in the Background of the Invention and in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. A laser light receiver, comprising:
a housing;
a first laser light photosensor, which generates a first signal if receiving a beam of laser light energy from an external laser light source;
a visible readout to indicate if said laser light receiver is substantially on-grade with respect to said beam of laser light energy;
a visible light marker;
a distance measuring device that uses a second laser light source and a second laser light photosensor, said distance measuring device being used to substantially determine a first distance between said second laser light photosensor and a predetermined external position, as selected by a user of said laser light receiver apparatus while aiming said visible light marker, said second laser light photosensor generating a second signal if receiving reflected laser light energy from said second laser light source;

a level vial; and a processing circuit that receives said first signal and said second signal;

wherein said housing, said first laser light photosensor, said distance measuring device, said level vial, said visible readout, and said processing circuit are assembled as a unitary hand-held apparatus.

2. The laser light receiver as recited in claim 1, wherein said processing circuit is configured to:

(a) substantially determine a relative location of said laser light receiver with respect to said beam of laser light energy, and if said relative location is on-grade, to output a third signal to said visible readout;

(b) substantially determine a corrected first distance, based upon said second signal and an inherent distance due to component positioning within said housing; and (c) substantially determine a relative elevation between said predetermined external position and said beam of laser light energy, based upon said corrected first distance if said relative location is substantially on-grade, and if said laser light receiver is substantially level.

3. The laser light receiver as recited in claim 2, wherein said level vial is visually read by said user so as to allow said laser light receiver to be held in an orientation that is substantially level while said processing circuit determines said relative elevation.

4. The laser light receiver as recited in claim 2, further comprising an acoustic output device; wherein if said relative location is substantially on-grade, said processing circuit is further configured to output a fourth signal causing an audible tone to be generated by said acoustic output device.

5. The laser light receiver as recited in claim 1, wherein said first signal generated by the first laser light photosensor includes sufficient information that allows said processing circuit to substantially determine a second distance between said beam of laser light energy and a current position of said laser light receiver.

6. The laser light receiver as recited in claim 5, wherein said first laser light photosensor comprises one of:

(a) a plurality of photodetector elements that each individually output one of a first plurality of electrical signals if impacted by said beam of laser light energy, in which said first plurality of electrical signals is used by said processing circuit to substantially determine said second distance; and (b) a rod sensor comprising an elongated light pathway having two ends and two photodetector elements, one of said photodetector elements positioned at each of said two ends of the light pathway, said photodetector elements each individually outputting one of a second plurality of electrical signals, in which said beam of laser light energy impacts said rod sensor at a location along the elongated light pathway, and the second plurality of electrical signals is used by said processing circuit to substantially determine said second distance.

7. The laser light receiver as recited in claim 5, wherein said processing circuit is further configured to:

(a) substantially determine a relative location of said laser light receiver with respect to said beam of laser light energy, and to output a third signal to said visible readout;

(b) substantially determine a corrected first distance, based upon said second signal and an inherent distance due to component positioning within said housing; and (c) substantially determine said relative elevation between said predetermined external position and said beam of laser light energy, based upon said corrected first distance and said second distance, and if said laser light receiver is substantially level.

8. The laser light receiver as recited in claim 7, wherein said level vial is visually read by said user so as to allow said laser light receiver to be held in an orientation that is substantially level while said processing circuit determines said relative elevation.

9. A laser light receiver, comprising:

a housing;

a first laser light photosensor, which generates a first signal if receiving a beam of laser light energy from an external laser light source;

a visible readout to indicate if said laser light receiver is substantially on-grade with respect to said beam of laser light energy;

a visible light marker;

a distance measuring device that uses a second laser light source and a second laser light photosensor, said distance measuring device being used to substantially determine a first distance between said second laser light photosensor and a predetermined external position, as selected by a user of said laser light receiver apparatus while aiming said visible light marker, said second laser light photosensor generating a second signal if receiving reflected laser light energy from said second laser light source;

a gravity sensor that generates a third signal that is substantially indicative of an angular orientation of said housing with respect to gravity; and a processing circuit that receives said first signal, said second signal, and said third signal;

wherein said housing, said first laser light photosensor, said distance measuring device, said gravity sensor, said visible readout, and said processing circuit are assembled as a unitary hand-held apparatus.

10. The laser light receiver as recited in claim 9, wherein said processing circuit is configured to:

(a) substantially determine a relative location of said laser light receiver with respect to said beam of laser light energy, and if said relative location is on-grade, to output a fourth signal to said visible readout;

(b) substantially determine a corrected first distance, based upon said second signal, an inherent distance due to component positioning within said housing, and said third signal to compensate for the angular orientation of said housing with respect to gravity; and (c) substantially determine a relative elevation between said predetermined external position and said beam of laser light energy, based upon said corrected first distance and said second distance, if said relative location is substantially on-grade.

11. A laser light receiver, comprising:

a housing;

a first laser light photosensor, which generates a first signal if receiving a beam of laser light energy from an external laser light source, said first signal being indicative of a second distance between said beam of laser light energy and an on-grade position of said laser light receiver;

a visible light marker;

a distance measuring device that uses a second laser light source and a second laser light photosensor, said distance measuring device being used to substantially determine a first distance between said second laser light photosensor and a predetermined external position, as selected by a user of said laser light receiver apparatus while aiming said visible light marker, said second laser light photosensor generating a second signal if receiving reflected laser light energy from said second laser light source;

a gravity sensor that generates a third signal that is substantially indicative of an angular orientation of said housing with respect to gravity;

a visible readout to indicate a relative elevation; and a processing circuit that receives said first signal, said second signal, and said third signal;

wherein said housing, said first laser light photosensor, said distance measuring device, said gravity sensor, said visible readout, and said processing circuit are assembled as a unitary hand-held apparatus.

12. The laser light receiver as recited in claim 11, wherein said processing circuit is configured to:
  (a) substantially determine said second distance based upon said first signal;
  (b) substantially determine a corrected first distance, based upon said second signal, an inherent distance due to component positioning within said housing, and said third signal to compensate for the angular orientation of said housing with respect to gravity;
  (c) substantially determine said relative elevation, which is a vertical distance between said predetermined external position and said beam of laser light energy, based upon said corrected first distance and said second distance; and
  (d) output a fourth signal to said visible readout so as to display said relative elevation.

13. The laser light receiver as recited in claim 11, wherein said processing circuit is configured to:
  (a) substantially determine said second distance based upon said first signal;
  (b) substantially determine a corrected first distance, based upon said second signal, an inherent distance due to component positioning within said housing, and said third signal to compensate for the angular orientation of said housing with respect to gravity;
  (c) substantially determine said relative elevation, based upon said corrected first distance and said second distance; and
  (d) output a fourth signal to said visible readout so as to display said relative elevation;
  wherein said relative elevation is displayed in terms of one of:
  (e) elevation of said predetermined external position with respect to sea level;
  (f) elevation of said housing with respect to sea level;
  (g) elevation of said housing with respect to said beam of laser light energy; and
  (h) elevation of said housing with respect to said predetermined external position.

14. The laser light receiver as recited in claim 12, further comprising an input control device actuatable by a user that places said laser light receiver into an automatic measurement mode, such that said processing circuit is further configured to substantially determine said relative elevation on a repetitive basis and, if predetermined conditions occur, to store in a memory circuit at least one value of said relative elevation.

15. The laser light receiver as recited in claim 14, wherein said at least one stored value of said relative elevation is displayed on said visible readout.

16. The laser light receiver as recited in claim 14, further comprising an audible output device that generates an audible signal upon the occurrence of said predetermined conditions, and after at least one value of said relative elevation has been stored in said memory circuit.

17. A laser light receiver, comprising:
  a housing;
  a first laser light photosensor, which generates a first signal if receiving a beam of laser light energy from an external laser light source, said first signal being indicative of a second distance between said beam of laser light energy and an on-grade position of said laser light receiver;
  a visible light marker;
  a distance measuring device that uses a second laser light source and a second laser light photosensor, said distance measuring device being used to substantially determine a first distance between said second laser light photosensor and a predetermined external position, as selected by a user of said laser light receiver apparatus while aiming said visible light marker, said second laser light photosensor generating a second signal if receiving reflected laser light energy from said second laser light source;
  a GPS (global positioning sensor) receiver that generates a third signal that is indicative of a position with respect to the Earth's surface;
  a tilt indication device;
  a visible readout to indicate a relative elevation between said predetermined external position and said beam of laser light energy; and
  a processing circuit that receives said first signal, said second signal, and said third signal;
  wherein:
  (a) said housing, said first laser light photosensor, said distance measuring device, said tilt indication device, said visible readout, said GPS receiver, and said processing circuit are assembled as a unitary hand-held apparatus; and
  (b) said processing circuit is configured to: (i) use said third signal is to substantially determine a position in the horizontal plane with respect to the Earth's surface, and (ii) use said first and second signals to substantially determine said relative elevation, based upon said first distance and said second distance.

18. The laser light receiver as recited in claim 17, wherein said relative elevation based on said first and second signals has greater accuracy than an elevation fix based upon said third signal generated by said GPS receiver.

19. The laser light receiver as recited in claim 17, wherein said tilt indication device comprises a level vial.

20. The laser light receiver as recited in claim 17, wherein said tilt indication device comprises a gravity sensor that generates a fourth signal that is substantially indicative of an angular orientation of said housing with respect to gravity, and wherein said processing circuit receives said fourth signal and uses it to compensate for the angular orientation of said housing with respect to gravity.

21. The laser light receiver as recited in claim 17, wherein said visible readout indicates if said laser light receiver is one of: (a) substantially on-grade with respect to said beam of laser light energy; (b) above grade with respect to said beam of laser light energy;

and (c) below grade with respect to said beam of laser light energy.

22. The laser light receiver as recited in claim 17, wherein said first laser light photosensor comprises one of:
   (a) a plurality of photodetector elements that each individually output one of a first plurality of electrical signals if impacted by said beam of laser light energy, in which said first plurality of electrical signals is used by said processing circuit to substantially determine said second distance; and
   (b) a rod sensor comprising an elongated light pathway having two ends and two photodetector elements, one of said photodetector elements positioned at each of said two ends of the light pathway, said photodetector elements each individually outputting one of a second plurality of electrical signals, in which said beam of laser light energy impacts said rod sensor at a location along the elongated light pathway, and the second plurality of electrical signals is used by said processing circuit to substantially determine said second distance.

23. A method for determining an elevation, said method comprising:
   providing a laser light receiver having: a housing, a first laser light photosensor that generates a first signal if receiving a beam of laser light energy from an external laser light source, a visible readout, a visible light marker, a distance measuring device that uses a second laser light source and a second laser light photosensor, a level vial, and a processing circuit;
   aiming said visible light marker at a predetermined external position, while holding said housing at a substantially level orientation, as indicated by said level vial;
   determining substantially a first distance between said second laser light photosensor and said predetermined external position, by use of said distance measuring device;
   determining substantially a second distance of said laser light receiver with respect to said beam of laser light energy; and
   determining substantially a relative elevation between said predetermined external position and said beam of laser light energy, based upon said first distance and said second distance.

24. The method as recited in claim 23, further comprising the step of generating an audible tone by an acoustic output device if said housing is on-grade.

25. The method as recited in claim 23, further comprising the step of automatically determining said relative elevation, even if said housing is not on-grade.

26. A method for determining an elevation, said method comprising:
   providing a laser light receiver having: a housing, a first laser light photosensor that generates a first signal if receiving a beam of laser light energy from an external laser light source, a visible readout, a visible light marker, a distance measuring device that uses a second laser light source and a second laser light photosensor, a gravity sensor which generates a tilt-angle signal that is substantially indicative of an angular orientation of said housing with respect to gravity, and a processing circuit;
   aiming said visible light marker at a predetermined external position, while holding said housing at a user-desired orientation;
   determining substantially a first distance between said second laser light photosensor and said predetermined external position, by use of said distance measuring device;
   determining substantially a second distance of said laser light receiver with respect to said beam of laser light energy; and
   determining substantially a relative elevation, based upon said first distance and said second distance.

27. The method as recited in claim 26, further comprising the step of automatically determining said relative elevation, even if said housing is not on-grade.

28. The method as recited in claim 26, further comprising the step of automatically determining said relative elevation, even if said housing is not oriented so as to be level, by:
   (a) determining substantially a corrected second distance using said tilt-angle signal; and
   (b) determining substantially a corrected first distance using said tilt-angle signal, and an inherent distance due to component positioning within said housing.

29. The method as recited in claim 26, further comprising the step of displaying said relative elevation on said visible readout.

30. The method as recited in claim 29, wherein said relative elevation is displayed in terms of a vertical elevation between said beam of laser light energy and said predetermined external position.

31. The method as recited in claim 29, wherein said relative elevation is displayed in terms of one of:
   (a) elevation of said predetermined external position with respect to sea level;
   (b) elevation of said housing with respect to sea level;
   (c) elevation of said housing with respect to said beam of laser light energy; and
   (d) elevation of said housing with respect to said predetermined external position.

* * * * *